United States Patent [19]
Aggarwal et al.

[11] Patent Number: 6,151,589
[45] Date of Patent: Nov. 21, 2000

[54] METHODS FOR PERFORMING LARGE SCALE AUCTIONS AND ONLINE NEGOTIATIONS

[75] Inventors: Charu Chandra Aggarwal, Yorktown Heights; Philip Shi-Lung Yoo, Chappaqua, both of N.Y.

[73] Assignee: International Business Machines Corporation, Armonk, N.Y.

[21] Appl. No.: 09/151,200

[22] Filed: Sep. 10, 1998

[51] Int. Cl.[7] .................................................. G06F 17/60
[52] U.S. Cl. ............................... 705/37; 705/35; 705/36; 705/26; 705/1; 705/27; 705/14; 395/729; 395/237
[58] Field of Search ................................. 705/37, 35, 36, 705/26, 1, 27, 14; 395/729, 237

[56] References Cited

U.S. PATENT DOCUMENTS

| | | | |
|---|---|---|---|
| 5,640,569 | 6/1997 | Miller et al. | 710/241 |
| 5,774,873 | 6/1998 | Berent et al. | 705/26 |
| 5,803,500 | 9/1998 | Mossberg | 283/67 |
| 5,835,896 | 11/1998 | Fisher et al. | 705/37 |
| 5,890,138 | 3/1999 | Godin et al. | 705/26 |
| 5,905,975 | 5/1999 | Ausubel | 705/37 |
| 5,924,082 | 7/1999 | Silverman et al. | 705/37 |
| 6,006,201 | 12/1999 | Berent et al. | 705/27 |
| 6,023,685 | 2/2000 | Brett et al. | 705/37 |
| 6,026,383 | 2/2000 | Ausubel | 705/37 |
| 6,044,363 | 3/2000 | Mori et al. | 705/37 |

FOREIGN PATENT DOCUMENTS 52-061942  5/1977  Japan.
9-147035  6/1997  Japan.

OTHER PUBLICATIONS

"Yahoo! Auctions adds tool that simplifies auction management", Electronic Advertising & Marketplace Report, vol. 13, p4,3/4p, Jun. 1999.

Garda, B; Wilson, G.V., "Building and running online auctions", Dr. Dobb's Journal, vol. 22, No. 10, p. 84,86–8, 91, 104, Jun. 1999.

*Primary Examiner*—Eric W. Stamber
*Assistant Examiner*—Akiba Robinson-Boyce
*Attorney, Agent, or Firm*—Scully, Soctt, Murphy & Presser; David M. Shofi, Esq.

[57] ABSTRACT

A method for performing continuous auctions over a computer network system consisting of a server/seller and multiple clients/buyers. The seller makes information about the type of sale items, the number of sale items, minimum bid price, time limits for bids to be submitted, and estimated time interval to the next auction decision available to the buyer by displaying it on buyers' computer terminals. Each buyer responds by entering a bid and such bid's duration, within the time limits set by the seller, in to the auction system through buyers' computer terminals. Additionally, a buyer's bid entry time is saved by the system. Determining the response time for present buyers to schedule the next auction. At least one auction winner, whose bid is within bid duration, is selected through a dynamically adjusted customer selection method.

62 Claims, 5 Drawing Sheets

METHODS FOR PERFORMING LARGE SCALE AUCTIONS AND ONLINE NEGOTIATIONS

BACKGROUND OF THE INVENTION

1. Field of the Invention

The present invention relates generally to auctions and, more particularly, auctions over the Internet. The invention is directed to repeated auctions of commodities over a continuous time period.

2. Description of Prior Art

An auction is a method of selling goods through the process of competition. At an auction, buyers, who are referred to as bidders, make competitive bids for goods, and sellers designate goods, which are up for sale to the highest bidder. Sellers who conduct the process of bidding are referred to as auctioneers.

The important principle in auctioning is to allow buyers the initiative of determining the market price through mutual competition, rather than having the price set by the seller. When a seller determines the market price, he is quoting his opinion on the value of goods, and then possibly negotiating with the individual buyer. This is one of the reasons why the auction method has often been used traditionally for auctioning of scarce valuable items, whose exact market prices are difficult to determine. In recent years the techniques of auctioning have begun to become increasingly favorable for commodities transactions on the Internet.

Examples of traditional auctions, performed for centuries, are described below.

1. The Ascending Order or an English Auction: the bidders quote successively higher prices in order to determine the best price for the goods. The goods are sold to the highest bidder. Thus, the order of the bids are ascending in terms of the price level.

The starting bid may be decided either by the auctioneer or by one of the potential buyers. Many variations are possible on the English auction, e.g., providing fixed price advances for each bid, or providing minimums on each advance.

An example of an ascending auction is the Interval Auction. Here, the bidding must be conducted in a certain time interval. This time interval gives bidders reasonable time to consider their bids. For example, it may be pre decided that the auction will start at 3 p.m., and the final decision on the auction will be made at 3:30 p.m. This gives the buyers 30 minutes to ponder and to raise their bids before a final decision is made. The following are the tradeoffs in adjusting the time interval for an auction:

A. If the time-interval is too long, the auction is too slow and the rate of sales will slow down.

If the time-interval is too short, the bidders will not have sufficient time to bid against each other and sufficiently raise the price.

2. The Descending Auction or a Dutch Auction: the auctioneer starts by quoting a high price and successively recites lower bids at regular intervals, until one of the bidders accepts that price. It is important to understand that quoting a good initial price is critical to the success of the descending auction. If the initial price which is quoted is too high, then the auctioneer may spend too much time reciting bids which are not useful. If the initial bid price is too low, then the auctioneer may be unable to obtain the best price for the goods.

3. The Simultaneous Bidding or a Japanese Auction: all bids are made by prospective buyers at the same time. The highest bid is taken to be the price at which the goods are finally sold. This technique is often utilized for the sale of fish in Tokyo.

In simultaneous bidding, it is possible for one buyer to make multiple bids for a given item. For example, a bidder may provide the following three bids for a given item: $50, $20, and $10. If it turns out that the highest bid that any other buyer in the system has made is $18, then the bid for $20 may be awarded to the buyer. This kind of technique reduces the chances that a bidder may overpay because of the lack of knowledge about the bids made by other bidders.

Similarly, in a Haphazard Bidding system, the bidders are unaware of the exact nature of the bids made by others. An example of such a scheme is the written tender scheme in which bids are made in writing and posted to an auction official. The best bid is picked from among these. In a haphazard bidding systems, sometimes considerable temptation may exist for the seller to move the auction to its advantage, since the buyers are not aware of each other's bids.

All the auction methods described above are techniques which are more suited for "one-time" transactions as opposed to repeated transactions of commodities over a continuous time period. Today, typical auction methods proceed by doing auctions at specified times. There exists a need to run continuous auctions over long periods of time on Internet in order to set prices and to sell large scale commodities.

SUMMARY OF THE INVENTION

The present invention discloses a technique for conducting auctions at dynamically adjusting time intervals. The time intervals for the auctions are adjusted in such a way that auctions are not so slow, that buyer's timed bids are excluded. At the same time, the auctions are adjusted not to be so fast that bidders do not have time to bid against each other sufficiently. This creates a dynamic adjustment in the trade-offs of the time intervals to perform the bidding.

A method of the present invention performs continuous auctions over a computer network system consisting of multiple clients/buyers which are computer systems connected via a network to a server/seller which is a computer system comprising a CPU, a disk and memory. The seller makes information about the type of sale items, the number of sale items, minimum bid price, and time limits for bids to be submitted. Each buyer responds by entering a bid and such bid's duration within the time limits set by the seller into the auction system through buyers' computer terminals. Additionally, a buyer's bid entry time is saved by the auction system.

To schedule the next auction, the estimated time interval to the next auction decision is determined by selecting premium buyers whose bids are above a certain predefined market premium and calculating a maximum time before which a certain percentage of bids of these premium buyers will not expire. The target queue length is then calculated by using average bid response intervals for the premium bidders and the target queue length. The current queue length is compared to the target queue length in order to readjust the target time at which the next auction winner will be selected.

At least one auction winner, whose bid is within the bid duration is selected through a dynamically adjusted customer selection method. This dynamically adjusted customer selection method finds all buyers whose bids are higher than a predetermined amount set by a seller. The method then computes arrival and defection times of these selected buyers, based on each buyer's bid entry time and the buyer' bid duration, in order to determine these buyers who have the lowest value of the sum of the arrival and defection times. Based on these computations and the buyer's intended purchase volume the winners are declared.

In the present invention, a bid made by a given buyer may be valid across multiple auctions. A bidder not only specifies the price that he is willing to pay, but also the maximum time for which such a bid is valid. For example, assuming that a bid made by a buyer is valid for a period of one hour and that decisions on auctions are made at the rate of one every 15 minutes, then if a buyer's bid expires before that bid is declared as the winner, then this is said to be a defection or an expiry. A bidder is allowed to renew the defection bid. Whenever the bidder renews the defection bid, the new maximum time for which that bid is valid must also be specified.

The method of the present invention improves on the prior art by defining automated time-interval auctions, in which the times at which the auctions are conducted are specific to the information provided by the buyers who make the bids. The information provided by the bidders is as follows:

1. The amount of the bid.
2. The time at which the bid is entered. This information need not be explicitly provided by the bidder. When a bid is submitted, the system clock automatically records the time at which the bid was made.
3. The time duration for which the bid is valid. A bid can be valid across multiple auction sessions.

The time-interval of the auction is determined by the nature of the times at which the bids of the buyers and the sellers in the system are registered. If there are many bidders in the system whose bids are valid for long periods of time, then the time intervals between auctions are kept large. On the other hand, when there are many bidders in the system whose bids are valid for short periods of time, then the time-intervals of the auctions are kept short. This is done in order to reduce the rate of expiring of bids from high bidders. The time interval between successive auctions takes into account both the bids of the buyers as well as that of the sellers.

The process of the present invention includes:

1. determining time intervals between auctions, using the information provided by bidders about the amount of each bid,
2. determining the time at which a buyer entered the system, and
3. determining the time for which each bid is valid.

The automated system of the present invention optimizes the auctioneers' objective function of keeping the buyers bidding against each other, while making sure that the premium bidders do not defect. Thus, the speeds of the auction decisions are dynamically adjusted in correspondence with the times that bidders are willing to wait in the system. Therefore, when there is a large number of bidders in the system who are bidding high, then the rate at which each auction decision is made will be increased by the automated system, otherwise the rate of bidding will be reduced.

DETAILED DESCRIPTION OF THE INVENTION

The present invention conducts repeated, continuous interval auctions over the Internet. Running repeated, continuous interval auctions is necessary for continuous sale of identical commodity items. For example, it may be desirable to sell a commodity at 3:00 p.m., 3:30 p.m., 4:00 p.m., 4:30 p.m., and so on in 30 minute intervals. In order to sell the commodity at a given time, say 3:30 p.m., bids made by buyers between 3:00 p.m. and 3:30 p.m. will be considered. The buyer making the highest bid between 3:00 and 3:30 p.m. is declared to be the winner.

Figure 1:
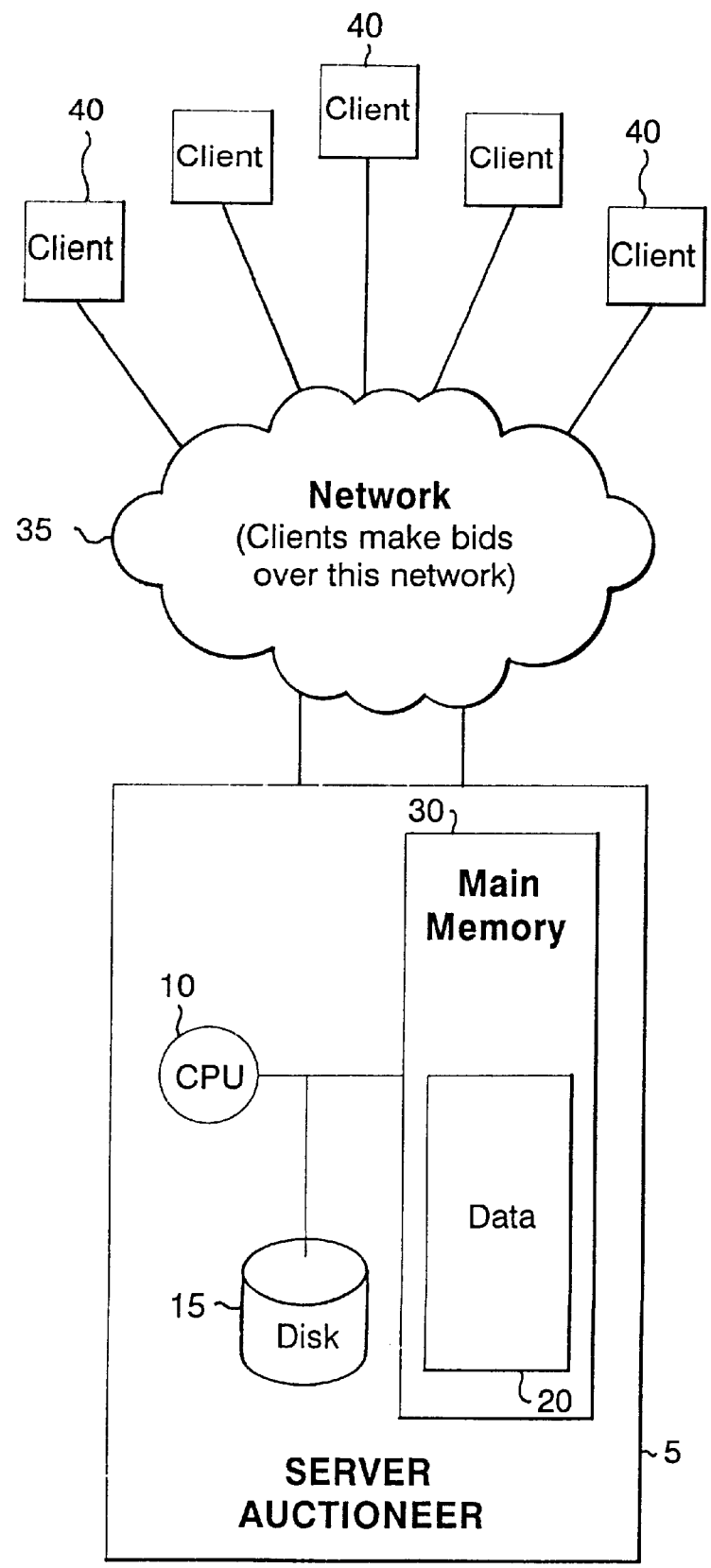
FIG. 1 is a graphical depiction of the architecture of the present invention.

FIG. 1 shows the hardware architecture of the present invention, which consists of multiple clients 40 communicating with the server 5 over a network 35. The clients 40 are the bidders, and the server 5 is the auctioneer. The server 5 consists of a CPU 10, a disk 15, and the main memory 30. The task of deciding how to adjudicate the received bids is performed by the CPU 10, and the data 20 e.g., bids, resides in the main memory 30. The disk 15 contains the data corresponding to the bids.

Figure 2:
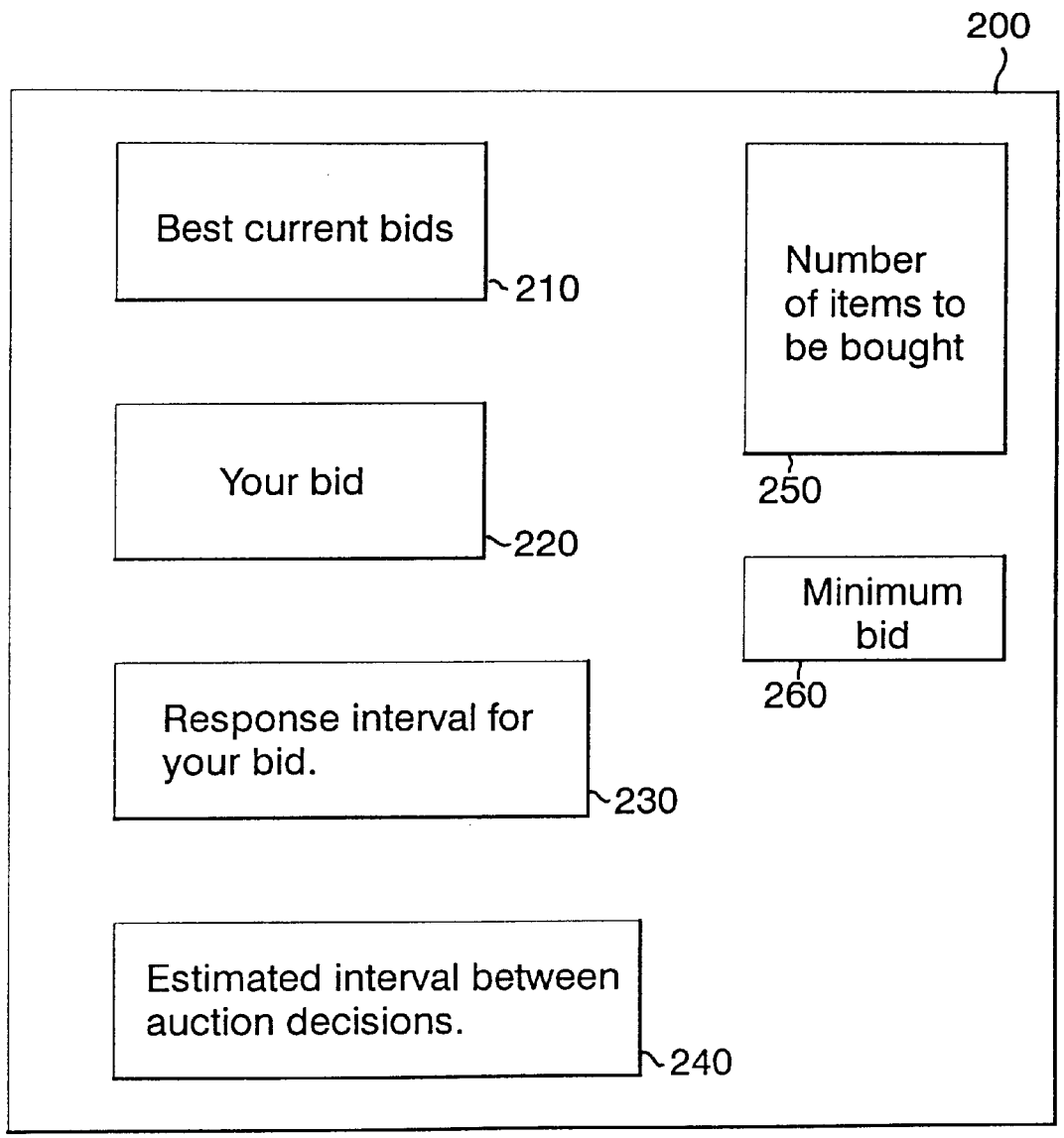
FIG. 2 is a graphical depiction of the user interface for the auctioning algorithm of the present invention.

FIG. 2 shows, the user interface 200 between each client 40 (FIG. 1) and the server 5 (FIG. 1). The user interface 200 contains six informational components provided to each bidder, who is present at the client end.

1. Best current bids 210 which are in the system, may be specified either exactly or approximately. The auctioneer has the flexibility of choosing any number of best bids to show to the bidders. Approximate specification refers to the fact that only ranges for current bids may be specified. If desired, this feature may even be excluded from the user interface. In the preferred embodiment, bidders are making blind bids, because they do not know what bids other buyers have specified.
2. Buyer's bid 220, specified by the bidder, and equal to the number of dollars which bidder is willing to pay for the item.
3. Response interval for the buyer's bid, indicates the time that the client is willing to wait for his/her bid to remain valid. Thus, this feature is specified by the client in that client's user interface.
4. Estimated interval between the auction decisions 240, specified by the auctioneer or the server, which states the current rate at which the auctions are taking place. This number may change dynamically as the auction progresses. The number is provided to the client since it is useful for the client to decide the nature of his/her response interval depending upon the rate at which the auctions are taking place.
5. Number of items, of a given type, to be bought 250 which a bidder may wish to buy. For example, a bidder may provide an order for a bundle of commodities of a given kind.

6. Minimum bid 260, provided by the auctioneer.

Figure 3:
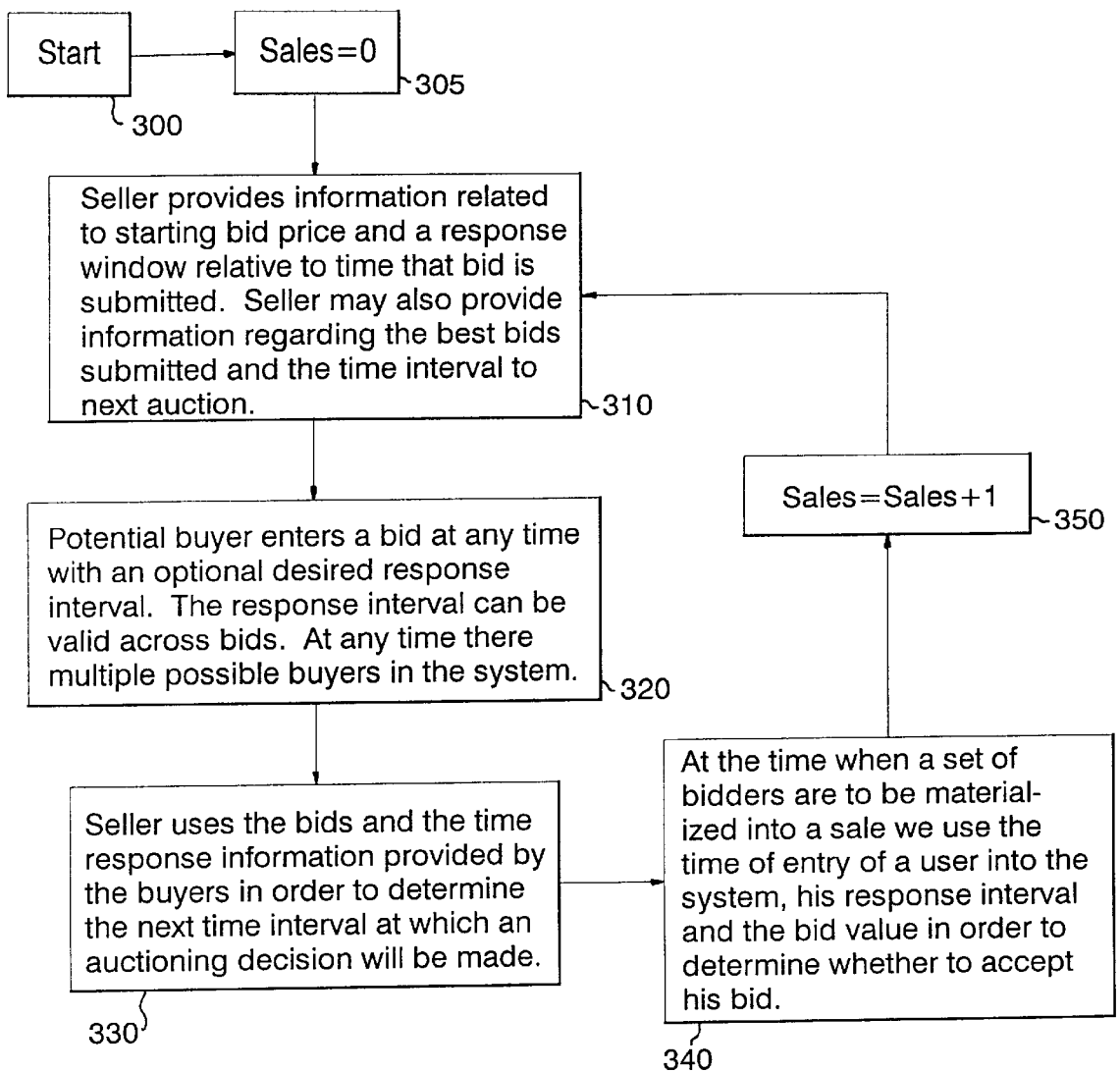
FIG. 3 is a flowchart diagram of the computer implementation of a part of the present invention which allows the auctioneer at the server end and customers at the client end to interact.

FIG. 3 shows a flowchart of the automated auction software at the server end. The program starts at step 300 and proceeds to the initializing of the variable "Sales", which indicates the total number of sales made so far, to 0 in step 305. In step 310, the seller, the auctioneer at the server end, provides information related to the starting bid price, and a response window relative to the time that the bid is submitted. The starting bid price may be newly entered into the system or calculated from results of previous auctions. Additionally, the seller indicates the estimated time interval to the next auction decision. The auctioneer may provide supplemental information, e.g., the best set of bids which have been submitted so far 210 (FIG. 2).

A potential buyer may enter a bid at any time with an optional desired response interval in step 320. This response interval can be valid across bids. At any given time there may be multiple possible buyers in the system. Thus, the automated computer driven auction software is aware of multiple bids which have been provided to the system. From each bid, the auction software holds three selections of information:

1. the price of the bid,
2. the response interval,
3. the time at which a buyer entered the bid.

The auctioneer uses the information regarding the bids in order to determine the response time for the various buyers in the system, in order to determine when to schedule the next auction, step 330. once it has been determined that an auction should be executed, the auctioneer, in step 340, determines the winning buyer. In making that determination, the auctioneer uses information such as the time of arrival of a bidder into the system, the bidder's estimated response time, and the price of his bid.

Figure 4:
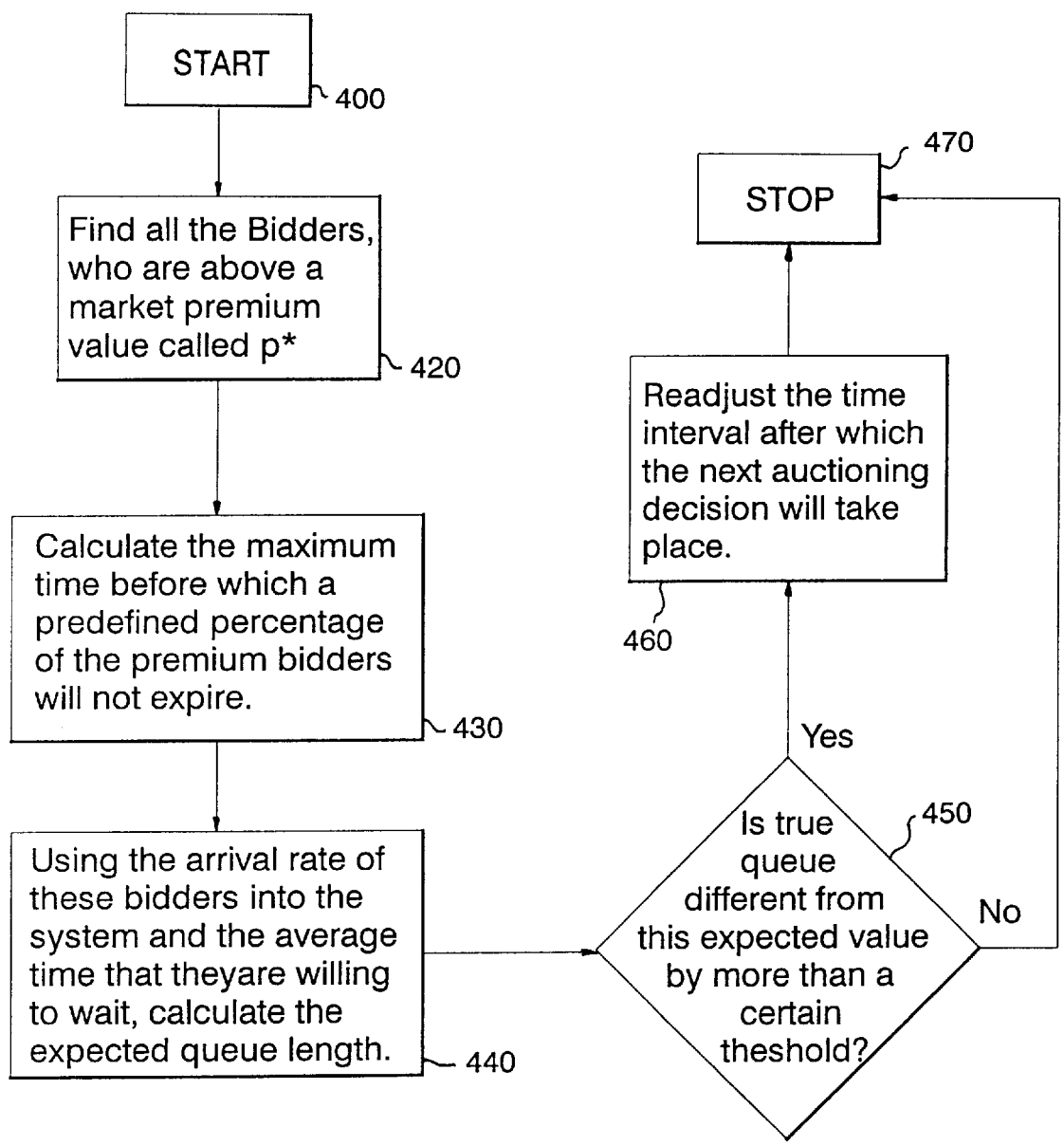
FIG. 4 is a flowchart diagram of the computer implementation of a part of the present invention describing the calculation of the intervals for auctioning decisions.

FIG. 4 shows steps of a technique for calculating correct time intervals. This recalculation is done at the beginning of each auction interval. However, the present invention does not exclude the possibility of this recalculation being done at periodic time intervals which are larger or smaller than the auction interval. After being started in step 400, the program for calculating correct time intervals determines, in step 420, the number of buyers whose bids are above a certain predefined market premium p*. The buyers who made such bids will be referred to as premium bidders. It is one of the objectives of the present invention to manage the time intervals of the auction in such a way that the bids of as many premium bidders as possible are accepted.

In step 430, the maximum time before which a predefined percentage of the premium bidders will not expire is calculated. Thus, it is preferable to keep the auction fast enough so that most premium bidders are retained, while keeping the auction slow enough so that buyers bid against each other for a sufficient number of times. The arrival rate of the premium bidders in the system is defined by the rate at which bids were made by these people entering into the system. In step 440 the target queue length is calculated by using the average bid response intervals for the premium bidders and the target queue length. Step 450 determines if the true queue length differs from the expected queue length by more than a certain threshold. If it is not, then the program terminates in step 470. Otherwise, the target time at which the next auction decision will be made is readjusted in step 460. The rate at which the readjustment is accomplished, i.e., the speeding up or the slowing down of the target time, is based on the predefined seller interval. Step 470 terminates the program.

Figure 5:
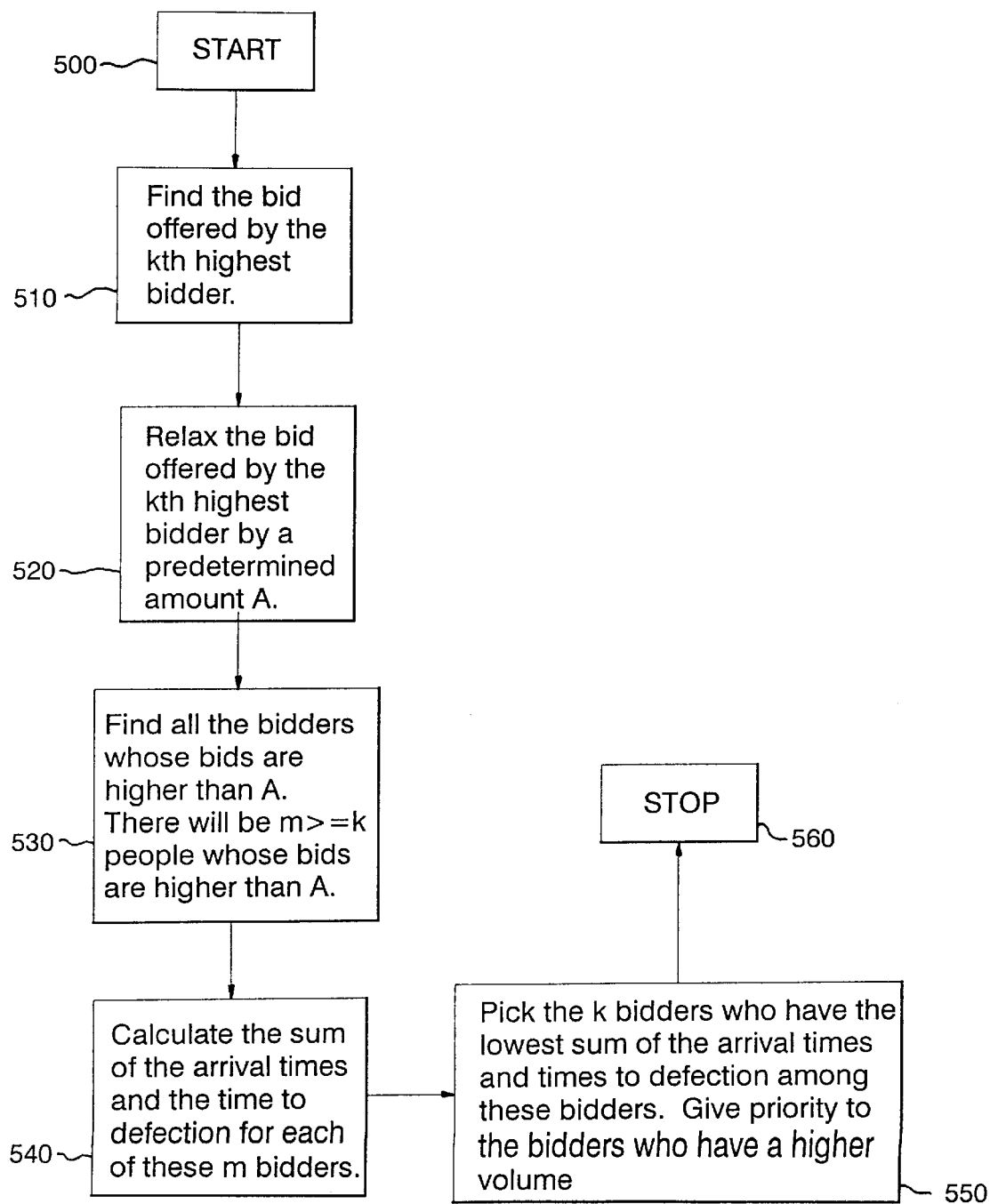
FIG. 5 is a flowchart diagram of the computer implementation of a part of the present invention describing how the actual bids are decided and which sellers are accepted as successful bidders.

FIG. 5 shows the flow of a program for finding the best decisions for auctions. The simple technique of always awarding the highest bidder(s) is one possibility. It may sometimes be desirable to pick a bidder based on the time of that bidder's arrival, the length of that bidder's bids, and the value of that bidder's bid. This ensures that high priced bidders who are about to defect are not lost unnecessarily. After starting the program in step 500, the bid found by the $k^{th}$ highest bidder is evaluated in step 510. In step 520, this bid is relaxed by a predetermined amount "A".

All the bidders whose bids are higher than "A" are ascertained in step 530. There will be m>=k buyers whose bids are higher than A. The value of m is chosen by the auctioneer, i.e., the server 5 (FIG. 1), and accepted as a system configurable parameter. The arrival and defection times of these m bidders will be used in order to determine whom to declare as the successful bidder(s). In step 540 the sum of the arrival and defection times of each of these m>=k bidders is computed. In step 550 k bidders who have the lowest value of the sum of the arrival and defection times are determined and declared as successful bidders. Priority may also be given to bidders who have bid above a certain predefined volume. The program then terminates in step 560.

The present invention provides an ability of using a combination of several factors, which may be used to determine the winning bidder. Another flexibility provided by this invention is the fact that if a buyer bids above a certain default value, then that buyer's bid is accepted. In the event that the buyer's response window is less than the seller response window, then a way is provided to set a target price for this buyer. In other words, a fixed price is set. If a buyer has a response window which is less than the time at which the next auction decision will be made, then a check is made to determine if the value of the bid was above this fixed price. If such is indeed the case, then the bidder is awarded the commodity.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for conducting continuous auctions for continuous sale of identical items over a computer network consisting of plurality of buyers and at least one seller, the method comprising the following steps:

communicating seller information including an estimated time interval to the next auction decision;

accepting buyer information for each of said buyers including a bid price, a bid entry time, a bid duration, and an intended purchase volume; and dynamically scheduling a next auction through determining a response time for said buyers by using said buyer information, said scheduling adjusted in a manner such that buyers are retained in said auction for as lone as Possible.

2. The method of claim 1, further comprising the step of dynamically selecting at least one auction winner from among said buyers, said bid price of said auction winner being within said bid duration.

3. The method of claim 2, wherein said seller information further comprises an asking price, and time limits within which said bid price is to be submitted.

4. The method of claim 3, wherein if said bid duration is not entered, said time limits will be accepted as said bid duration.

5. The method of claim 4, further comprising the step of displaying status information on computer terminals of said buyers, said status information comprising: a current best bid price, said bid price, and said seller information.

6. The method of claim 5, wherein said dynamically selecting step further comprises the steps of:
   a. ascertaining all said buyers for whom said bid price is higher than said asking price;
   b. relaxing said bid price by a predetermined amount and evaluating said bid price for each of said buyers;
   c. computing arrival and defection times of said buyers, based on said bid entry time and said bid duration, to determine said buyers having a lowest value of a sum of said arrival and defection times; and
   d. declaring said auction winner based on steps a) through c) and said intended purchase volume.

7. The method of claim 6, wherein said estimated time interval is determined by following steps:
   determining a number of premium buyers for whom said bid price is above a predefined market premium;
   calculating a maximum time before which a predefined percentage of said premium buyers will not expire;
   calculating a target queue length using average bid response intervals for the premium buyers and said target queue length and determining whether a true queue length differs from an expected queue length by more than a predefined threshold; and
   readjusting a target time at which said auction winner will be selected.

8. The method of claim 7, wherein said target time readjusting rate is based on a predefined interval set by said seller.

9. The method of claim 8, wherein said estimated time interval is determined at the beginning of each said estimated time interval.

10. The method of claim 9, wherein said estimated time interval is determined at periodic time intervals which are larger than said estimated time interval.

11. The method of claim 10, wherein said estimated time interval is determined at periodic time intervals which are smaller than said estimated time interval.

12. The method of claim 11, wherein said seller information further comprising a minimum bid price.

13. The method of claim 12, wherein said minimum bid price is provided by calculating results of previous auctions.

14. The method of claim 13, wherein said minimum bid price is a seller specified default price.

15. The method of claim 14, wherein said bid price is accepted only if it is higher than said minimum bid price, and is within said time limits.

16. The method of claim 15, wherein said target time readjusting rate is based on a queuing model using an arrival rate for said bidders, an average bid expiry time and a target queue length, said model guaranteeing a certain rate of defection of said buyers.

17. A computer program device readable by a machine, tangibly embodying a program of instructions executable by a machine to perform method steps for conducting continuous auctions for continuous sale of identical items over a computer network consisting of plurality of buyers and at least one seller, the method comprising the following steps:
   communicating seller information including an estimated time interval to the next auction decision;
   accepting buyer information for each of said buyers including a bid price, a bid entry time, a bid duration, and an intended purchase volume; and
   dynamically scheduling a next auction through determining a response time for said buyers by using said buyer information, said scheduling adjusted in a manner such that buyers are retained in said auction for as lone as possible.

18. The method of claim 17, further comprising the step of dynamically selecting at least one auction winner from among said buyers, said bid price of said auction winner being within said bid duration.

19. The method of claim 18, wherein said seller information further comprises an asking price, and time limits within which said bid price is to be submitted.

20. The method of claim 19, wherein if said bid duration is not entered, said time limits will be accepted as said bid duration.

21. The method of claim 20, further comprising the step of displaying status information on computer terminals of said buyers, said status information comprising: a current best bid price, said bid price, and said seller information.

22. The method of claim 21, wherein said dynamically selecting step further comprises the steps of:
   a. ascertaining all said buyers for whom said bid price is higher than said asking price;
   b. relaxing said bid price by a predetermined amount and evaluating said bid price for each of said buyers;
   c. computing arrival and defection times of said buyers, based on said bid entry time and said bid duration, to determine said buyers having a lowest value of a sum of said arrival and defection times; and
   d. declaring said auction winner based on steps a) through c) and said intended purchase volume.

23. The method of claim 22, wherein said estimated time interval is determined by following steps:
   determining a number of premium buyers for whom said bid price is above a predefined market premium;
   calculating a maximum time before which a predefined percentage of said premium buyers will not expire;
   calculating a target queue length using average bid response intervals for the premium buyers and an arrival rate of the premium bidders and determining whether a true queue length differs from an expected queue length by more than a predefined threshold; and
   readjusting a target time at which said auction winner will be selected.

24. The method of claim 23, wherein said target time readjusting rate is based on a predefined interval set by said seller.

25. The method of claim 24, wherein said estimated time interval is determined at the beginning of each said estimated time interval.

26. The method of claim 25, wherein said estimated time interval is determined at periodic time intervals which are larger than said estimated time interval.

27. The method of claim 26, wherein said estimated time interval is determined at periodic time intervals which are smaller than said estimated time interval.

28. The method of claim 27, wherein said seller information further comprising a minimum bid price.

29. The method of claim 28, wherein said minimum bid price is provided by calculating results of previous auctions.

30. The method of claim 29, wherein said minimum bid price is a seller specified default price.

31. The method of claim 30, wherein said bid price is accepted only if it is higher than said minimum bid price, and is within said time limits.

32. The method of claim 31, wherein said target time readjusting rate is based on a queuing model utilizing an arrival rate for said bidders, an average bid expiry time and a target queue length, said model guaranteeing a certain rate of defection of said buyers.

33. A method for conducting continuous auctions for continuous sale of identical items over a computer network consisting of plurality of buyers and at least one seller, the method comprising the following steps:

communicating seller information including an estimated time interval to the next auction decision, and an asking price;

accepting buyer information for each of said buyers including a bid price, a bid entry time, a bid duration, and an intended purchase volume;

ascertaining all said buyers for whom said bid price is higher than said asking price;

adjusting successive estimated time intervals using said buyer information in order to retain buyers having bid prices above said asking price in said auction for as lone as possible; and dynamically selecting at least one auction winner from among said buyers in each interval, based on said buyer information.

34. The method of claim 33, wherein said seller information further comprises time limits within which said bid price is to be submitted.

35. The method of claim 34, wherein if said bid duration is not entered, said time limits will be accepted as said bid duration.

36. The method of claim 35, further comprising the step of displaying status information on computer terminals of said buyers, said status information comprising: a current best bid price, said bid price, and said seller information.

37. The method of claim 36, wherein said dynamically selecting step further comprises the steps of:

relaxing said bid price by a predetermined amount and evaluating said bid price for each of said buyers; and computing arrival and defection times of said buyers, based on said bid entry time and said bid duration, to determine said buyers having a lowest value of a sum of said arrival and defection times.

38. The method of claim 37, wherein said estimated time interval is determined by following steps:

determining a number of premium buyers for whom said bid price is above a predefined market premium;

calculating a maximum time before which a predefined percentage of said premium buyers will not expire;

calculating a target queue length using average bid response intervals for the premium buyers and an arrival rate of the premium bidders and determining whether a true queue length differs from an expected queue length by more than a predefined threshold; and readjusting a target time at which said auction winner will be selected.

39. The method of claim 38, wherein said target time readjusting rate is based on a predefined interval set by said seller.

40. The method of claim 39, wherein said estimated time interval is determined at the beginning of each said estimated time interval.

41. The method of claim 40, wherein said estimated time interval is determined at periodic time intervals which are larger than said estimated time interval.

42. The method of claim 41, wherein said estimated time interval is determined at periodic time intervals which are smaller than said estimated time interval.

43. The method of claim 42, wherein said seller information further comprising a minimum bid price.

44. The method of claim 43, wherein said minimum bid price is provided by calculating results of previous auctions.

45. The method of claim 44, wherein said minimum bid price is a seller specified default price.

46. The method of claim 45, wherein said bid price is accepted only if it is higher than said minimum bid price, and is within said time limits.

47. The method of claim 46, wherein said target time readjusting rate is based on a queuing model utilizing an arrival rate for said bidders, an average bid expiry time and a target queue length, said model guaranteeing a certain rate of defection of said buyers.

48. A computer program device readable by a machine, tangibly embodying a program of instructions executable by a machine to perform method steps for conducting continuous auctions for continuous sale of identical items over a computer network consisting of plurality of buyers and at least one seller, the method comprising following steps:

communicating seller information including an estimated time interval to the next auction decision, and an asking price;

accepting buyer information for each of said buyers including a bid price, a bid entry time, a bid duration, and an intended purchase volume;

ascertaining all said buyers for whom said bid price is higher than said asking price;

adjusting successive estimated time intervals using said buyer information in order to retain buyers having bid prices above said asking price in said auction for as long as possible; and dynamically selecting at least one auction winner from among said buyers in each interval, based on said buyer information.

49. The method of claim 48, wherein said seller information further comprises time limits within which said bid price is to be submitted.

50. The method of claim 49, wherein if said bid duration is not entered, said time limits will be accepted as said bid duration.

51. The method of claim 50, further comprising the step of displaying status information on computer terminals of said buyers, said status information comprising: a current best bid price, said bid price, and said seller information.

52. The method of claim 51, wherein said dynamically selecting step further comprises the steps of:

relaxing said bid price by a predetermined amount and evaluating said bid price for each of said buyers; and computing arrival and defection times of said buyers, based on said bid entry time and said bid duration, to determine said buyers having a lowest value of a sum of said arrival and defection times.

53. The method of claim 52, wherein said estimated time interval is determined by following steps:

determining a number of premium buyers for whom said bid price is above a predefined market premium;

calculating a maximum time before which a predefined percentage of said premium buyers will not expire;

calculating a target queue length using average bid response intervals for the premium buyers and an arrival rate of the premium bidders and determining whether a true queue length differs from an expected queue length by more than a predefined threshold; and readjusting a target time at which said auction winner will be selected.

54. The method of claim 53, wherein said target time readjusting rate is based on a predefined interval set by said seller.

55. The method of claim 54, wherein said estimated time interval is determined at the beginning of each said estimated time interval.

56. The method of claim 55, wherein said estimated time interval is determined at periodic time intervals which are larger than said estimated time interval.

57. The method of claim 56, wherein said estimated time interval is determined at periodic time intervals which are smaller than said estimated time interval.

58. The method of claim 57, wherein said seller information further comprising a minimum bid price.

59. The method of claim 58, wherein said minimum bid price is provided by calculating results of previous auctions.

60. The method of claim 59, wherein said minimum bid price is a seller specified default price.

61. The method of claim 60, wherein said bid price is accepted only if it is higher than said minimum bid price, and is within said time limits.

62. The method of claim 61, wherein said target time readjusting rate is based on a queuing model utilizing an arrival rate for said bidders, an average bid expiry time and a target queue length, said model guaranteeing a certain rate of defection of said buyers.

* * * * *

UNITED STATES PATENT AND TRADEMARK OFFICE
CERTIFICATE OF CORRECTION

PATENT NO. : 6,151,589
DATED : November 21, 2000
INVENTOR(S) : C. Aggarwal et al.

It is certified that error appears in the above-identified patent and that said Letters Patent is hereby corrected as shown below:

Title page,
Item [75], Inventors: "Yoo" should read -- Yu --
Attorney, Agent, or Firm: "Soctt" should read -- Scott --
References Cited, U.S. PATENT DOCUMENTS, insert:
-- 4,789,928  12/1988  Fujisaki
   4,799,156  1/1989   Shavit et al.
   5,684,863  11/1997  Katz
   5,689,652  11/1997  Lupien et al.
   5,715,402  2/1998   Popolo --

Column 1,
Line 38, "The starting..." should not begin new paragraph.
Line 55, "If the..." should read -- B. If the... --

Column 2,
Line 61, "target queue length"s should read -- arrival rate of the premium bidders --

Column 5,
Line 57, "target queue length" should read -- arrival rate of the premium bidders --

Column 6, claim 1,
Line 56, "lone" should read -- long --
Line 57, "Possible" should read -- possible --

Column 8, claim 17,
Line 4, "lone" should read -- long --

UNITED STATES PATENT AND TRADEMARK OFFICE
CERTIFICATE OF CORRECTION

PATENT NO. : 6,151,589
DATED : November 21, 2000
INVENTOR(S) : C. Aggarwal et al.

It is certified that error appears in the above-identified patent and that said Letters Patent is hereby corrected as shown below:

Column 9, claim 33,
Line 20, "lone" should read

Signed and Sealed this

First Day of January, 2002

Attest:

Attesting Officer

JAMES E. ROGAN
Director of the United States Patent and Trademark Office